United States Patent [19]

Yeoman et al.

[11] Patent Number: 5,593,548
[45] Date of Patent: Jan. 14, 1997

[54] METHOD FOR CONCURRENT REACTION WITH DISTILLATION

[75] Inventors: Neil Yeoman, Merrick, N.Y.; Ronald Pinaire, Wichita, Kans.; Michael A. Ulowetz, Wichita, Kans.; Timothy P. Nace, Wichita, Kans.; David A. Furse, Wichita, Kans.

[73] Assignee: Koch Engineering Company, Inc., Wichita, Kans.

[21] Appl. No.: 335,216

[22] Filed: Nov. 7, 1994

Related U.S. Application Data

[63] Continuation of Ser. No. 962,266, Oct. 16, 1992, abandoned, which is a continuation-in-part of Ser. No. 775,010, Oct. 11, 1991, Pat. No. 5,291,989, which is a continuation of Ser. No. 475,971, Feb. 6, 1990, Pat. No. 5,108,550.

[51] Int. Cl.$^6$ .................................................. B01D 3/00
[52] U.S. Cl. ...................... 203/29; 202/158; 203/DIG. 6; 261/97; 422/191; 422/195
[58] Field of Search .................... 202/158; 203/DIG. 6, 203/29, DIG. 16; 422/191, 195; 261/109, 110, 114.1, 96, 97

[56] References Cited

U.S. PATENT DOCUMENTS

| | | |
|---|---|---|
| 2,676,875 | 4/1954 | Barr . |
| 3,509,043 | 4/1970 | McMaster et al. ..................... 208/213 |
| 3,541,000 | 11/1970 | Hanson et al. . |
| 3,607,000 | 9/1971 | Beal ...................................... 423/659 |
| 3,629,478 | 12/1971 | Haunschild . |
| 3,634,535 | 1/1972 | Haunschild . |
| 3,796,655 | 3/1974 | Armistead et al. ............... 208/216 PP |
| 3,882,167 | 5/1975 | Lohmar et al. . |
| 4,126,539 | 11/1978 | Derr, Jr et al. . |
| 4,191,629 | 3/1980 | Chervanak ............................. 208/408 |
| 4,213,847 | 7/1980 | Chen et al. . |
| 4,239,614 | 12/1980 | Hutchings ............................. 208/146 |
| 4,302,356 | 11/1981 | Smith, Jr. . |
| 4,307,254 | 12/1981 | Smith, Jr. . |
| 4,313,908 | 2/1982 | Gupta ................................... 422/111 |
| 4,380,529 | 4/1983 | Gupta ................................... 422/220 |
| 4,439,350 | 3/1984 | Jones, Jr. . |
| 4,443,559 | 4/1984 | Smith, Jr. . |
| 4,471,154 | 9/1984 | Franklin . |
| 4,540,831 | 9/1985 | Briggs . |
| 4,579,647 | 4/1986 | Smith . |
| 4,615,789 | 10/1986 | Bridge et al. .......................... 208/143 |
| 4,620,952 | 11/1986 | Hsieh . |
| 4,623,454 | 11/1976 | Tauscher et al. . |

(List continued on next page.)

FOREIGN PATENT DOCUMENTS

| | | |
|---|---|---|
| 402019 | 12/1990 | European Pat. Off. . |
| 0470655 | 2/1992 | European Pat. Off. . |
| 2437239 | 4/1980 | France . |
| 872938 | 4/1953 | Germany . |
| 2034597 | 6/1980 | United Kingdom . |

OTHER PUBLICATIONS

Patent Abstracts of Japan, vol. 8, No. 279 (C–257) [1716], 20th Dec. 1984; & JP–A–59 147 632 (Mitsui Zousen Engineering Aug. 24, 1984.

*Primary Examiner*—Virginia Manoharan
*Attorney, Agent, or Firm*—Shook, Hardy & Bacon L.L.P.

[57] ABSTRACT

A column having a region for reaction with distillation of fluid streams is provided with structures which include distillation trays that allow for the accumulation of liquid from a liquid stream and the passage of a vapor stream through the liquid for interaction therewith. The structures include catalyst beds which extend downwardly from the trays and are housed within at least partially perforate containers. A portion of the liquid on the tray is catalytically reacted as it is driven through the catalyst bed by the liquid head created by the accumulated liquid. Another portion of the liquid may be directed through a bypass which also extends downwardly from the tray and allows the liquid to bypass the catalyst bed so that higher volumetric flow rates can be achieved. A still further portion of the liquid can be directed to a zone between adjacent catalyst beds or within a catalyst bed for developing a liquid head to force the liquid laterally through the catalyst bed.

20 Claims, 10 Drawing Sheets

U.S. PATENT DOCUMENTS

| | | |
|---|---|---|
| 4,722,780 | 2/1988 | Franck et al. . |
| 4,731,229 | 3/1988 | Sperandio . |
| 4,836,989 | 6/1989 | Aly et al. ................................ 422/195 |
| 4,847,431 | 7/1989 | Nocca et al. . |
| 5,026,459 | 6/1991 | Quang et al. . |
| 5,073,236 | 12/1991 | Gelbein et al. . |
| 5,108,550 | 4/1992 | Pinaire et al. ............................ 203/29 |
| 5,120,403 | 6/1992 | Smith, Jr. ................................ 203/38 |
| 5,130,102 | 7/1992 | Jones, Jr. ........................ 203/DIG. 6 |
| 5,141,861 | 8/1992 | Dale ........................................ 435/162 |
| 5,291,989 | 3/1994 | Pinaire et al. ........................... 202/158 |

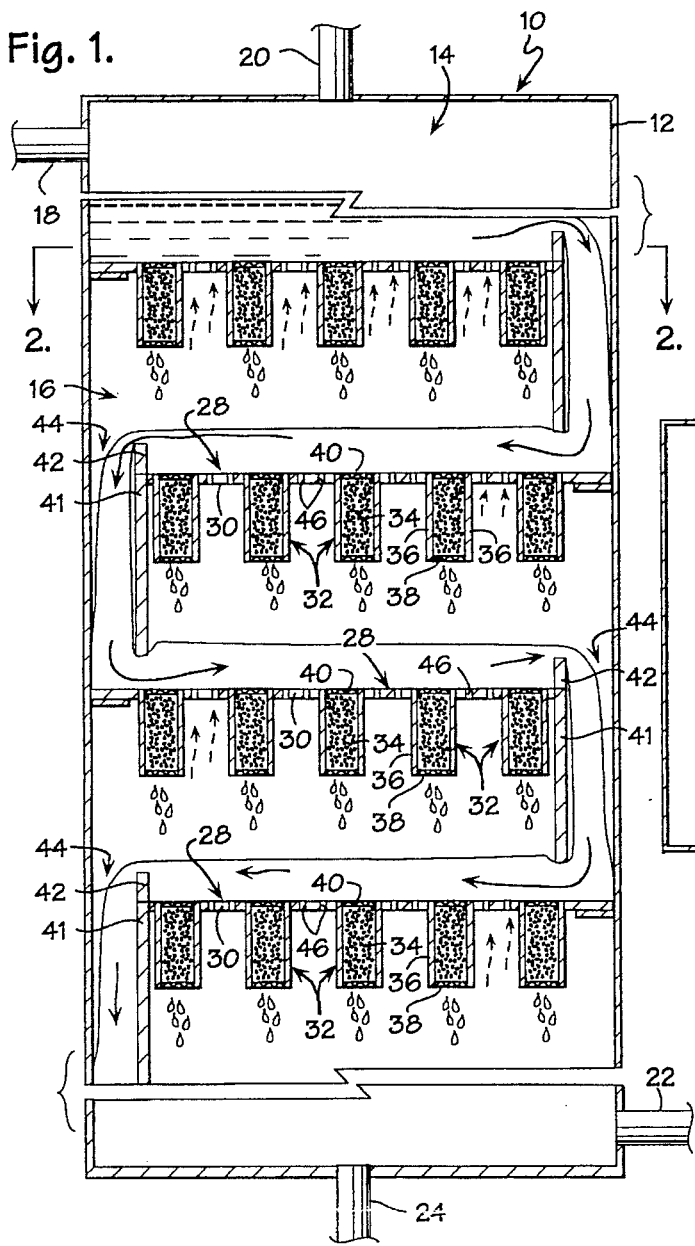
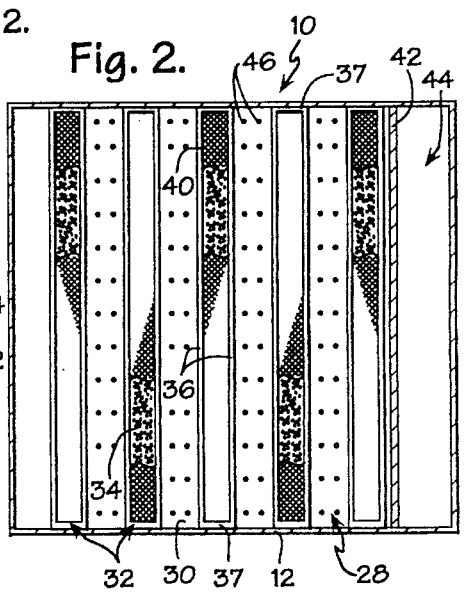

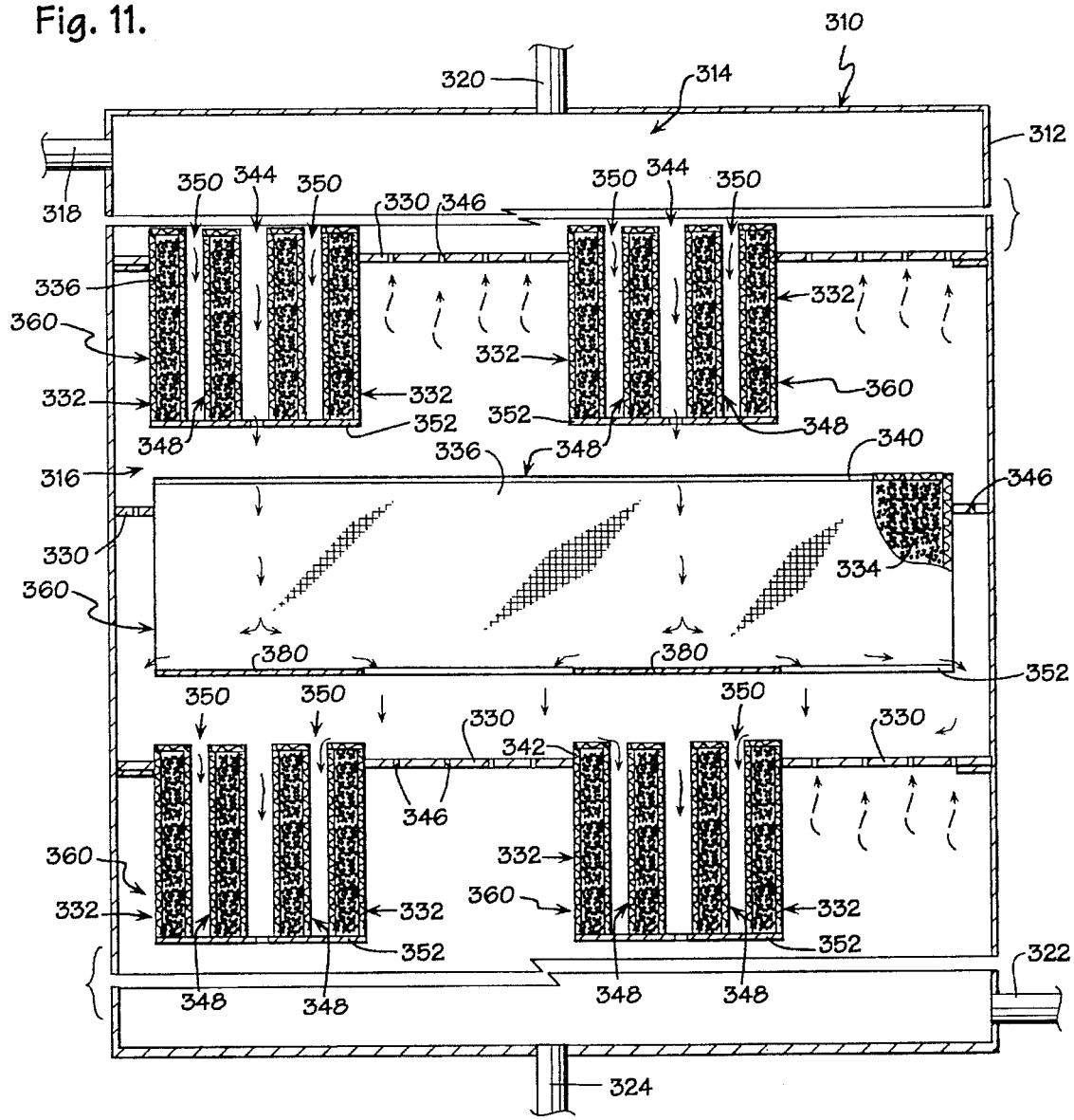

METHOD FOR CONCURRENT REACTION WITH DISTILLATION

This is a continuation of U.S. application Ser. No. 07/962,266, filed Oct. 16, 1992, now abandoned, which is a continuation-in-part of U.S. application Ser. No. 07/775,010, filed Oct. 11, 1991, now U.S. Pat. No. 5,291,989, which is a continuation of U.S. application Ser. No. 07/475,971, filed Feb. 6, 1990, now U.S. Pat. No. 5,108,550.

BACKGROUND OF THE INVENTION

This invention relates in general to a reaction with distillation column in which mass transfer and chemical reaction occur within the same general region within the column, and, more particularly, to a structure within the column which allows such mass transfer and chemical reaction to occur. The invention also relates to a process employing a plurality of such structures.

Various structures have been suggested for use in processes wherein concurrent reaction with distillation of fluid streams is desired. One such type of reaction with distillation structure employs a distillation tray and a downcomer which extends between adjacent distillation trays and is packed with catalyst particles to form a catalyst bed. The distillation tray facilitates mass transfer between the liquid and vapor streams while the catalyst bed in the downcomer causes the liquid stream to undergo catalytic reaction as it descends between trays. In the design of this type of structure as illustrated in Haunschild U.S. Pat. Nos. 3,629,478 and 3,634,535, all of the downwardly flowing liquid stream is channeled through the downcomer as it descends between adjacent trays.

Forcing all of the liquid to flow through the packed downcomer in the structure described above can be advantageous in certain applications because liquid feed is continually presented to the catalyst and the reaction product is removed from the catalyst surface at a rate fast enough to ensure that the reaction product does not inhibit the effectiveness of the catalyst. In many applications, however, it may be unnecessary to force all of the descending liquid through the packed downcomer because the desired chemical reaction can be accomplished by bringing only a portion of the liquid stream into contact with the catalyst. In such applications, the use of the packed downcomer structure as described may be undesirable because the liquid flow rate that can be achieved in the column is limited by the permeability of the catalyst bed.

Another type of conventional catalytic reaction with distillation structure employs a cloth belt which is supported by a steel wire support structure and has a plurality of pockets filled with catalyst. Smith U.S. Pat. Nos. 4,307,254 and 4,302,356 provide examples of structures of this type. The hydraulic characteristics of a reaction with distillation process which employs the cloth belt can be much higher than when the previously described packed downcomer is used because all of the descending liquid stream is not forced to flow through the catalyst pockets. Instead, the liquid stream is free to flow through the open areas surrounding the cloth belt.

The catalyst in the cloth belt structure previously described is wetted by the liquid soaking through the cloth covering and diffusing through the catalyst. Because the liquid is not forced through the catalyst in the cloth belt structure, the reaction products may in some instances be removed too slowly from contact with the catalyst. The catalyst effectiveness or reactivity in the cloth belt may thus be less than desired in certain applications.

In other applications in which the cloth belt is used, the column region containing the cloth belt may be flooded with liquid to enhance the catalytic reaction of the liquid. Because of the flooded conditions in that portion of the column, mass transfer between the liquid and vapor streams is substantially impeded. Provisions must then be made for allowing distillation to occur elsewhere within the column and the vapor stream must be bypassed around the flooded region. The cloth belt in those applications thus functions primarily as a reaction structure and not a combination reaction with distillation structure.

A still further example of a conventional reaction with distillation structure employs a packing such as in the form of corrugated plates which have a catalyst bed formed between pairs of adjacent plates. Multiple pairs of plates are then arrayed in alternating directions to form liquid and vapor flow channels in the troughs of the plates. This "sandwich" type construction can provide very high mass transfer rates because it causes more uniform distribution of and contact between the liquid and vapor streams. Hydraulic performance can also be very high because the flow channels allow most of the liquid stream to bypass the catalyst. In addition to the favorable mass transfer and hydraulic characteristics, the sandwich construction provides increased catalyst effectiveness because a portion of the liquid stream is forced through the catalyst beds at a rate which facilitates removal of the reaction product from contact with the catalyst.

Although the sandwich construction can provide better processing performance than either the downcomer or cloth belt structures previously described, it can also be much more expensive than those structures and economic considerations may prevent the use of the sandwich construction in many applications. A need has thus arisen for a more economical reaction with distillation structure that provides the desired reactivity as well as mass transfer and hydraulic performance so that the structure can be used in a greater range of chemical processing applications.

SUMMARY OF THE INVENTION

It is an object of this invention to provide, in a process column, a reaction with distillation structure which forces a portion of a descending liquid stream through a catalyst bed to continually present fresh liquid feed to the catalyst for reaction and to continually remove the reaction product from contact with the catalyst so that it does not impede reaction of the liquid feed, but which structure also allows another portion of the liquid stream to bypass the catalyst bed so that the desired liquid flow rate through the column can be achieved.

It is another object of this invention to provide a process in which a reaction with distillation structure is used to effect mass transfer between liquid and vapor streams and, in addition, provide the desired reactivity and hydraulic performance by causing a portion of the descending liquid stream to be driven through a catalyst bed while allowing another portion of the liquid stream to bypass the catalyst bed as it flows between adjacent reaction with distillation structures.

It is also an object of this invention to provide a reaction with distillation structure that provides the desired mass transfer performance while forcing only a portion of a liquid stream through a catalyst bed so that the desired hydraulic performance can be achieved.

It is a further object of this invention to provide a reaction with distillation structure constructed to provide the desired reactivity, mass transfer and hydraulic performance at a cost low enough to allow the structure to be economically used in many different types of reaction with distillation processes.

It is a still further object of this invention to provide a reaction with distillation structure which allows liquid to flow substantially horizontally through a catalyst bed as it descends between adjacent structures so that reduced resistance to flow can be achieved by reducing the distance of travel of the liquid through the catalyst bed and increasing the surface area of the catalyst bed which is open to fluid flow.

It is yet another object of this invention to provide a reaction with distillation structure which divides the catalyst bed among multiple containers so that the resistance to fluid flow through the divided catalyst beds is substantially reduced, including to the extent that the catalyst beds can accommodate all of the desired volume of liquid flow through the column containing the reaction with distillation structure.

To accomplish these and other related objects, in one aspect the invention is directed to a structure for use in a column for providing concurrent reaction with distillation of fluid streams flowing within said column, said structure comprising:

- a tray for accumulating liquid from a liquid stream;
- a container coupled with the tray for containing a catalyst bed through which a first portion of the accumulated liquid is directed; and
- a bypass coupled with the tray for allowing a second portion of the accumulated liquid to be directed from the tray without passing through said catalyst bed.

In another aspect, the invention is directed to a zone within the catalyst bed which is open at the top to receive another portion of the accumulated liquid without passing through the catalyst bed. Also included within the invention is a structure comprising a tray for accumulating liquid from a liquid stream, a container coupled with and extending below the tray for containing a catalyst bed through which a first portion of the accumulated liquid is directed, and a zone within the container which is open at the top to the flow of a second portion of the accumulated liquid from the tray into the zone without passing through the catalyst bed, said container having a perforate inner side wall in communication with said zone to permit the passage of part of said second portion of the liquid from the zone into the container.

In a further aspect, the invention is directed to a process for operating a column containing a plurality of reaction with distillation structures, each of said reaction with distillation structures comprising a tray, a catalyst bed extending downwardly below the tray, and a bypass which allows a liquid stream to descend from the tray without passing through the catalyst bed, said process comprising the steps of:

- supplying a liquid stream to one of said reaction with distillation structures and causing an accumulation of said liquid stream on the tray of said reaction with distillation structure;
- directing a first portion of the accumulated liquid stream through said catalyst bed for catalytic reaction to form a reaction product;
- directing a second portion of said accumulated liquid stream through said bypass;
- accumulating at least part of said first and second portions of the liquid stream on an underlying reaction with distillation structure after passage of said first portion through said catalyst bed and said second portion through the bypass; and
- directing a vapor stream upwardly through said reaction with distillation structures for contact with said descending liquid stream.

In a further process of the invention, spaced apart catalyst beds are provided and portions of the accumulated liquid stream are directed from the tray into a zone between the catalyst beds and then from the zone into the catalyst beds for catalytic reaction. Alternatively, the zone may be formed within a single catalyst bed, such as when the catalyst bed is of cylindrical configuration. Advantageously, it is a feature of this process that reduced resistance to liquid flow can be accomplished.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a fragmentary side elevational view of a reaction with distillation column containing a first embodiment of a reaction with distillation structure in accordance with the present invention and taken in vertical section;

FIG. 2 is a top plan view of a reaction with distillation structure of the present invention and of the type shown in the column of FIG. 1, the view being taken in horizontal section along line 2—2 of FIG. 1;

FIG. 11 is a fragmentary side elevational view of a column taken in vertical section and showing a further arrangement of the reaction with distillation structures shown in FIG. 10.

DESCRIPTION OF THE PREFERRED EMBODIMENT

Figure 3:
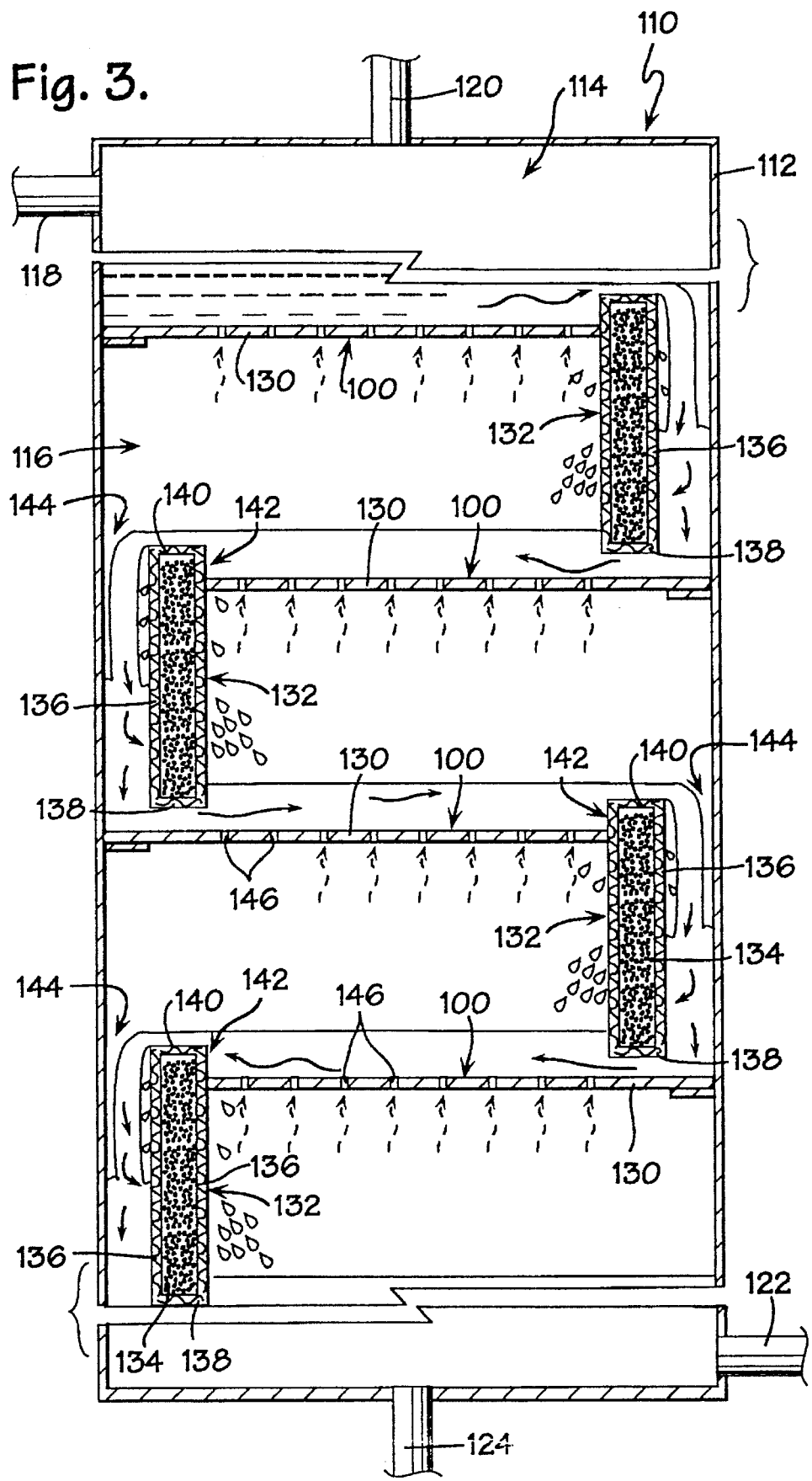
FIG. 3 is a fragmentary side elevational view of a column taken in vertical section and similar to that shown in FIG. 1 but employing another embodiment of a reaction with distillation structure in accordance with the present invention.

Referring now to the drawings in greater detail, and initially to FIG. 1, a reaction with distillation column in accordance with the present invention is represented broadly by the numeral 10. Column 10 may be any of various types of distillation columns and mass transfer reactors and includes an external upright shell 12 which may be of cylindrical, rectilinear or other desired configuration. While the column 10 has been shown as rectilinear for purposes of illustration, in commercial applications the column will typically be of cylindrical construction. A generally open internal chamber 14 is formed within shell 12 and includes a reaction with distillation region 16 in which both mass transfer and chemical reaction occur concurrently. Typically, the column 10 will include one or more other regions in which other processing such as distillation and/or other mass transfer processes occur. These additional regions may be above and/or below reaction with distillation region 16. In addition, multiple reaction with distillation regions 16 may be provided and may be separated by regions in which only mass transfer occurs.

Column 10 includes an upper inlet pipe 18 for directing a fluid stream, typically a liquid stream, within the shell 12 and into an upper portion of chamber 14. An upper outlet pipe 20 is provided for removing a vapor stream from the chamber 14 as an overhead. An inlet pipe 22 in a lower portion of chamber 14 allows for charging of a fluid stream such as a vapor stream to the column 10. A lower outlet pipe 24 is positioned in shell 12 for removal of a liquid bottoms. Additional inlet and outlet pipes and other column components such as reboilers and the like may also be provided.

A distributor (not shown) may optionally be utilized to feed a liquid stream into the reaction with distillation region 16. Any of various suitable types of collectors (not shown) may also be provided to collect the liquid stream from an upper region adjacent region 16 and feed it to the distributor. Similarly, the liquid stream leaving the region 16 may be collected by a device which feeds the liquid stream to an underlying region such as one in which only distillation occurs.

In accordance with the present invention, a plurality of reaction with distillation structures designated generally by the numeral 28 are provided within region 16. Each structure 28 includes a tray 30 and a plurality of spaced apart containers or troughs 32 which are coupled with tray 30 and extend downwardly therefrom. Each tray 30 is disposed generally horizontally and is suitably supported, such as on shell 12. The troughs 32 are filled with catalyst particles 34 and can be of any suitable cross-sectional configuration. As illustrated, the troughs 32 are generally rectilinear and extend in parallel rows between the opposed sides of shell 12. The longitudinal horizontal axes of troughs 32 in one structure 28 are shown in parallel orientation to the same axes of troughs 32 in adjacent structures 28. The orientation, however, may be varied anywhere between parallel and a 90° angle. It will also be appreciated that the troughs 32 need not extend completely between the opposed sides of the shell and in some applications it may be preferred that they do not. As another example, the catalyst filled troughs 32 can be generally cylindrical and can be arrayed in a predetermined pattern on the tray 30. Various other configurations and arrangements are possible and are within the scope of the invention.

Each of the troughs 32 includes parallel side walls 36 and parallel end walls 37 (FIG. 2) which are joined together. A bottom 38 and a cover 40 are joined to the side walls 36 and end walls 37 to complete the rectilinear enclosure. The side walls 36 are suitably connected to the tray 30 in a manner such that cover 40 is coplaner with tray 30. The cover 40 may be removable to allow for the loading of the catalyst particles 34 into the trough 32.

The cover 40 is formed of perforate material such as screening or other mesh-like material which allows for the passage of liquid from the tray 30 into the trough 32. The intersticial openings in the cover 40 should be sized small enough to prevent the catalyst particles 34 from passing through the cover. The bottom 38 and/or at least the lower portion of side walls 36 is also perforate to allow for the removal of liquid from within trough 32. Again, the openings in the bottom 38 or side walls 36 should be sized to prevent passage of the catalyst particles.

In order to prevent interference with the horizontal flow of liquid on trays 30, the bottom 38 of each trough 32 is preferably spaced from the underlying tray 30 so that it is not in contact with liquid which accumulates on that underlying tray. In certain construction, however, such as when troughs 32 are of a cylindrical configuration or when they do not extend all the way across the tray, it may be desirable for the troughs 32 to extend downwardly into contact with the underlying tray 30 or at least below the top surface of the liquid accumulating on that tray.

Each structure 28 also includes a downcomer plate 41, an upper portion of which functions as an overflow weir 42, positioned on the tray 30 downstream from the catalyst troughs 32. The weir 42 serves to cause accumulation of liquid on the tray 30 to a preselected depth before it overflows the weir 42. That portion of the liquid that overflows weir 42 flows through a bypass or downcomer 44 to the next lower reaction with distillation structure 28. The downcomer 44 may comprise any of various suitable devices for accommodating the flow of fluid and extends downwardly with a lower end spaced above the underlying tray 30. In some applications it may be desirable for the lower end of the downcomer 44 to extend below the level of the liquid on the underlying tray 30, while in other applications the downcomer lower end may terminate above the liquid level on the underlying tray. The downcomer 44 as illustrated is rectilinear in configuration with one wall being formed by plate 41 and the other walls being formed by the column shell 12. It will be appreciated that the downcomer 44 can assume many other configurations and can be formed in other suitable fashions. For example, when the troughs 32 are of cylindrical configuration, the downcomer 44 may be formed within one or more, including all, of the troughs 32. In such instances, the downcomer 44 would be centrally positioned and would extend generally from the top to the bottom of each trough. The catalyst bed would then fill the annular region surrounding the downcomer and would be generally ring-shaped in cross-section. A portion of the liquid entering the top of the downcomer in this configuration would pass downwardly through the downcomer without entering the catalyst bed while another portion would be forced from the downcomer through the catalyst bed.

In another configuration, the troughs 32 could be rectilinear as illustrated but the downcomer would be formed within one or more, including all, of the troughs 32. The downcomers could be rectilinear or cylindrical in configuration and each would be generally centrally positioned and would extend from the top to the bottom of the associated trough 32. The bottom of the downcomer could also be closed by an imperforate or partially perforate plate to prevent or reduce liquid flow out of the bottom of the downcomer. All or a portion of the liquid entering the downcomer would then be forced to flow through the surrounding catalyst bed as it is removed from the trough. Variations of this configuration will be subsequently described with reference to other figures in the drawings, and particularly with reference to FIG. 8.

The structures 28 are arranged in the column 10 so that the liquid which flows through any downcomer 44 must then travel back across the surface of the underlying tray 30 to reach the next downcomer 44 in the underlying structure 28, the direction of flow being illustrated by solid arrows in FIG. 1. Forcing the liquid to flow back and forth in this manner allows it to more thoroughly interact with vapor which is brought into contact with the liquid on the trays 30.

As can be seen in FIG. 2, each of trays 30 includes a plurality of apertures 46 which extend through the tray 30 in those portions of the tray between troughs 32. The apertures 46 are sized and positioned to allow the passage of ascending vapor (as indicated by the upwardly directed broken arrows in FIG. 1) during operation of column 10. The vapor as it rises through the trays 30 is able to contact the accumulating liquid on the trays 30 for interaction therewith. Mass transfer between the liquid and vapor streams can thus occur on trays 30 and also in the open area surrounding the troughs 32 as the ascending vapor contacts the descending liquid.

The pressure differential that drives the vapor through the apertures 46 in trays 30 also serves to prevent the downward flow of liquid through the apertures 46. It will be appreciated that other types of devices may be used in place of or with apertures 46 to allow passage of the vapor through the trays 30. Examples of these alternatives include bubble caps and valves. In certain applications the use of these and other alternative devices may be preferred.

The catalyst particles 34 packed in troughs 32 form permeable catalyst beds in which catalytic reaction of liquid occurs. The catalyst particles 34 may be formed of any suitable catalyst desired for a particular catalytic reaction process occurring within column region 16. The catalyst may be an acidic or basic catalyst or may comprise catalytic metals and their oxides, halides or other chemically reacted states. Molecular sieves may also be utilized as the catalyst. The catalyst should be heterogeneous with the system reaction and the fluids charged to the column 10. By way of example, acid cation exchange resins may be used for dimerization, polymerization, etherification, esterification, isomerization, and alkylation reactions. Other catalysts such as molecular sieves, magnesia, chromia and brucite may be used for isomerization reactions.

The catalyst particles 34 can be cylindrically shaped extrudates or can be in the form of small beads or the like or may comprise irregularly shaped granules or fragments. The term "particles" as used herein is intended to encompass all of the foregoing. The size of the catalyst particles may be varied depending upon the requirements of the particular applications. It will also be appreciated that the catalyst particles 34 could be formed into a porous slab instead of being packed in troughs 32. The need to provide an enclosure to house the catalyst particles would thus be eliminated. This is contemplated by and is within the scope of the invention.

In a method in accordance with the present invention, a fluid stream, preferably comprising a liquid stream, is charged to the column 10 such as through upper inlet pipe 18. The liquid stream may optionally pass through one or more regions, such as distillation zones, before it is fed to the reaction with distillation region 16. A vapor stream may also be charged to the column 10, such as through lower inlet pipe 22, and then directed to region 16. The vapor stream may, if desired, be directed through one or more intermediate regions. Alternately, the vapor stream may be generated within one or more regions below reaction with distillation region 16.

The liquid stream is charged to the uppermost reaction with distillation structure 28 and then flows across and accumulates on the associated tray 30 at flow rates which exceed the permeability through troughs 32. A first portion of the accumulating liquid is able to flow through the covers 40 of the catalyst filled troughs 32 and descend through the catalyst beds formed by the catalyst particles 34. Because the liquid accumulating on the tray 30 creates a liquid head, the liquid is continually forced through troughs 32 with a pressure determined by the liquid head. This pressurized flushing action constantly presents fresh liquid feed to the catalyst and removes the reaction product from contact with the catalyst. The catalyst is thus able to operate at high efficiencies, including near theoretical efficiency in certain processes.

Another portion of the liquid accumulating on each tray 30 is allowed to overflow the weir 42 and enter the downcomer 44 for passage to the underlying tray 30. The liquid traveling through downcomer 44 is thus able to descend between the trays without having to pass through the catalyst filled troughs 32. The use of downcomers 44 in this manner allows the hydraulic capacity of the column 10 to greatly exceed that of columns in which all of the liquid must pass through the catalyst bed.

The ratio of liquid which flows through troughs 32 to that which flows through downcomer 44 can, of course, vary widely depending upon the particular requirements of individual processes occurring within the column region 16. The amount of liquid passing through the catalyst troughs 32 will, in some applications, be selected to maximize the reactivity of the catalyst. As more liquid flows through the catalyst troughs 32, however, the average effective flow path of liquid across trays 30 and the residence time of the liquid on the trays is reduced. As a result, the effectiveness of the vapor-liquid interaction on the trays in reduced. Accordingly, the amounts of liquid flowing through troughs 32 and downcomer 44 must be balanced to achieve the mass transfer and catalytic efficiencies desired for particular processes.

As liquid exits the catalyst troughs 32, it may further contact and interact with the vapor stream ascending through the surrounding open space. The amount of liquid and vapor interaction which occurs in the open area surrounding the troughs 32 will typically be less than that which takes place as the vapor stream passes through the apertures 46 in trays 30 and bubbles through the liquid which is on the trays 30. It will be appreciated that liquid and vapor interaction in the open area surrounding the troughs 32 can be increased if desired by the placement of packing in such area. The packing may comprise any of various suitable plate-like, ring type or saddle type packing or other structures which are commercially or otherwise available.

It can thus be appreciated that the reaction with distillation structures 28 can accommodate a large volumetric flow rate of the liquid stream while still providing for high reactivity and mass transfer performance. The downcomer 44 on each tray 30 allows the increased flow rate to occur by permitting liquid to flow between the trays 30 without having to first pass through the catalyst beds provided in troughs 32. That portion of the liquid which does not reach the downcomer 44 enters troughs 32 under pressure from the liquid head developed by the liquid accumulating on the associated tray 30. This pressure causes more uniform and rapid distribution of the liquid throughout the catalyst bed and results in increased catalyst efficiency by removing the reaction product from contact with the surface of the catalyst. Mass transfer is also facilitated by causing the liquid stream to flow back and forth across descending levels of trays 30 where it is forced to interact with the vapor which is bubbling through the tray apertures 46.

Turning now to FIG. 3, an alternate embodiment of a reaction with distillation structure is broadly designated by the numeral 100. A plurality of such structures 100 are shown applied within a column 110 which may be of the same type as column 10 previously described. Portions of column 110 which correspond to like portions described with respect to column 10 have been assigned like numerals preceded by the prefix "1". A detailed description of those portions will not be repeated herein.

A plurality of the reaction with distillation structures 100 are arrayed in successive layers within the reaction with distillation region 116 of column 110. Each structure 100 comprises a tray 130 which is suitably supported, such as on the column shell 112, and a catalyst filled trough or container 132 which is disposed at one end of tray 130. Containers 132 are similar to troughs 32 previously described in that each is filled with catalyst particles 134 which form a catalyst bed for the catalytic reaction of liquid. Each container 132 likewise has a pair of side walls 136, a pair of end walls (not shown), a bottom 138 and a cover 140.

The containers 132 may extend completely or partially between opposed sides of shell 112. The container 132 in each structure is shown oriented parallel to containers in adjacent structures. Such orientation may, however, be varied between parallel and 90°.

Unlike the troughs previously described, a single container 132 is positioned at the end of each tray 130 and extends upwardly above as well as downwardly below the surface of the tray 130. That portion of each container 132 which extends above the tray 130 functions as an overflow weir 142 which causes the accumulation of liquid on tray 130. The container side wall 136 which is closest to the shell 112 also forms part of a bypass or downcomer 144 into which the liquid overflows from tray 130 and is directed to the underlying tray 130. The remaining walls of the downcomer 144 are formed by the walls of column shell 112. The downcomer 144 is not limited to the described construction and configuration but may comprise any of various suitable devices for accommodating the flow of liquid.

The cover 140 and sidewalls 136 of each container 132 are made of perforate material such as screen or mesh which is capable of retaining the catalyst particles 134 but permitting the ready passage of fluids. The bottom 138 is also shown as being formed of perforate material but it may alternately be formed of imperforate material.

The tray 130 includes a plurality of apertures 146 which accommodate the upward passage of vapor but generally do not permit the downward passage of liquid during operation of column 110. Alternative devices such as the bubble caps and valves previously mentioned may be substituted for apertures 146 to perform the same function.

The catalyst filled containers 132 extend downwardly below the associated tray 130 a sufficient distance so that the lower portion of each container 132 extends below the surface of the liquid on the underlying tray 130. When a sufficient liquid flow rate is established, the containers 132 thus cause liquid to back up in each downcomer 144. This backing up of liquid, which is normal for trays, is particularly advantageous because it creates a liquid head which forces liquid through the lower portion of the container 132 and the associated catalyst bed in a generally horizontal direction. Liquid which flows laterally through catalyst containers 132 travels a much shorter distance than liquid which enters the containers 132 through covers 140 and travels downwardly through the containers. The overall resistance to fluid flow through the catalyst containers 132 is thereby reduced by the use of the liquid head to drive a portion of the liquid laterally through the container 132. This results in an increase in the hydraulic capacity of the containers 132 above that which could ordinarily be accomplished by forcing all of the liquid to flow downwardly from the top towards the bottom of the catalyst bed within each container 132. Because the resistance to flow is directly proportional to the distance through which the liquid flows and is inversely proportional to the cross-sectional area of flow, it can be readily appreciated that the flow of liquid laterally through the containers 132 can significantly reduce the resistance to liquid flow.

Structures 100 function in a similar manner to those previously described with respect to column 10. Mass transfer resulting from vapor and liquid interaction occurs as the vapor bubbles upwardly through the apertures 146 and mixes with the liquid flowing across trays 130. The catalyst in containers 132 operates at high efficiency because liquid is forced through the catalyst bed not only by the liquid head developed by the liquid accumulating on each tray 130 and the liquid cresting over weir 142 but also by the backing up of liquid in downcomer 144. Greater liquid flow rates through column 110 can be achieved with the use of the open downcomer 144 than would otherwise be possible if all of the liquid were forced to flow through a catalyst packed downcomer. Notably, the hydraulic capacity of the catalyst containers is also enhanced by causing liquid to back up in downcomers 144 and exert a horizontally directed pressure which causes liquid to flow laterally into the containers 132 through the permeable side wall 136 adjacent the associated downcomer.

Figure 4:
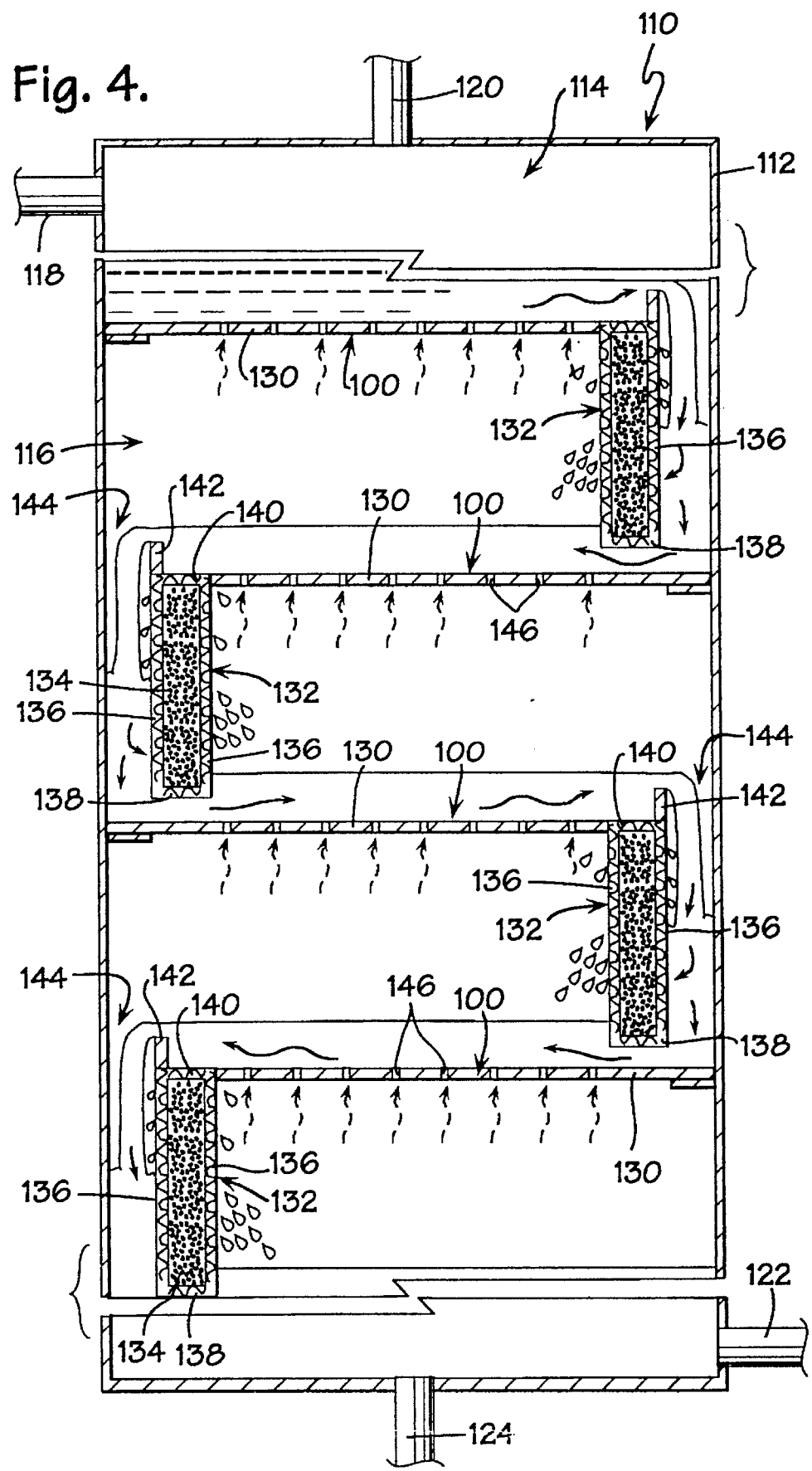
FIG. 4 is a fragmentary side elevational view of a column taken in vertical section and showing a reaction with distillation structure similar to that shown in FIG. 3 but with the tops of the catalyst containers shown level with the associated trays and plate-type overflow weirs being provided to cause liquid to accumulate on the trays.

It will be appreciated that the reaction with distillation structures 100 can be modified and still achieve the objectives of and be encompassed by the present invention. One such modification is illustrated in FIG. 4, where the catalyst containers 132 do not extend upwardly beyond the upper surface of trays 130. Instead, the container cover 140 is generally coplaner with the tray 130 and a solid plate 142 extends upwardly beyond the cover and functions as an overflow weir which causes the accumulation of liquid on tray 130. The plate 142 is shown in vertical alignment with the downstream side wall 136 of container 132 so that a portion of the liquid accumulating on tray 130 is forced through the container cover 140. Alternatively, the plate 142 could be located on the opposite or upstream side wall 136 so that liquid would enter the container 132 through cover 140 only after spilling over plate 142.

Figure 5:
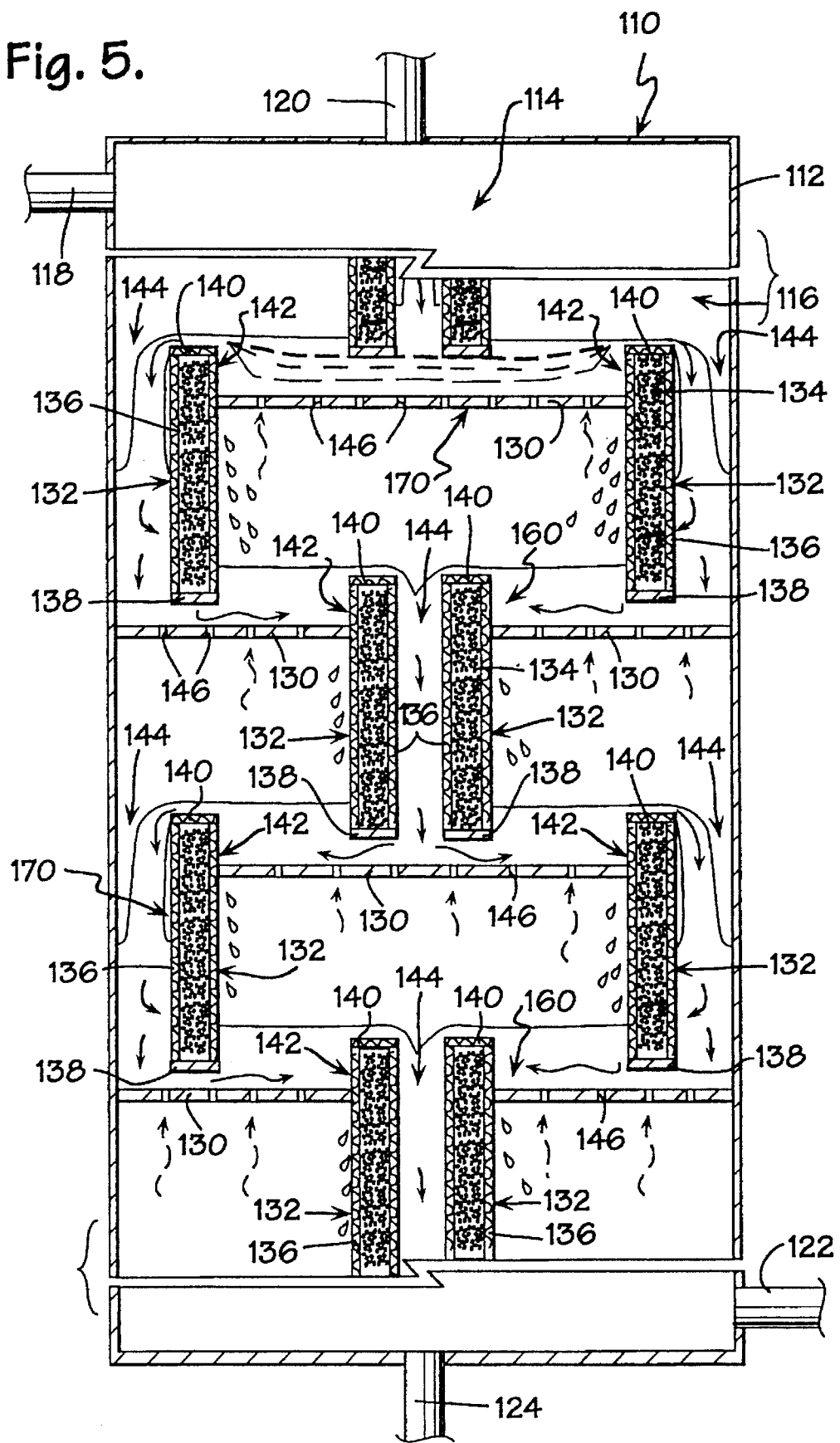
FIG. 5 is a fragmentary side elevational view of a column taken in vertical section and showing a double-pass version of the reaction with distillation structures shown in FIG. 3.

A more extensive modification to the reaction with distillation structure 100 shown in FIG. 3 is illustrated with reference to FIG. 5. In FIG. 5, alternating layers of reaction with distillation structures 160 and 170 are provided and are configured to provide for a double-pass flow scheme in contrast to the single-pass scheme illustrated in FIG. 3. Structures 160 comprise a pair of generally coplaner trays 130, each of which has a catalyst container 132 positioned at the end thereof and is similar to the structures 100 in FIG. 3. The structures 160, however, are oriented so that the containers 132 are centrally positioned in spaced apart relationship. The spacing between those containers 132 forms a central bypass or downcomer 144 into which liquid flows and accumulates as it overflows the tops of the containers. Accumulation of liquid in downcomer 144 is preferably achieved by providing limited clearance between the container bottoms 138 and the underlying tray 130. The imperforate bottoms 138 of containers 132 may optionally be extended into the downcomer 144 to restrict the opening at the bottom end thereof and facilitate the accumulation of liquid within the downcomer. This accumulating liquid develops a liquid head which forces the liquid laterally through the catalyst beds in both associated containers 132. It will be appreciated that the laterally flowing liquid will also gravitate downwardly under the influence of gravity and the influence of liquid flowing downwardly within the catalyst bed from above. The resultant directional flow of the liquid may thus be only generally horizontal. Advantageously, the laterally flowing liquid travels a shorter distance and encounters less flow resistance than that liquid entering containers 132 through covers 140 and the hydraulic capacity of the containers is correspondingly increased.

Liquid is directed from each structure 160 to the immediately underlying structure 170 which has catalyst containers 132 positioned at both ends of a single tray 130. Liquid which accumulates on the tray 130 of structure 170 is directed through either of containers 132 on the ends of tray 130 or through the downcomers 144 positioned between each container 132 and the column shell 112. This double-pass arrangement can accommodate greater liquid flow and more catalyst than the single-pass configuration of FIG. 3. It will be appreciated that three-pass, four-pass, five-pass or large arrangements are possible for increasingly greater liquid handling and catalyst containing capacities.

Figure 6:
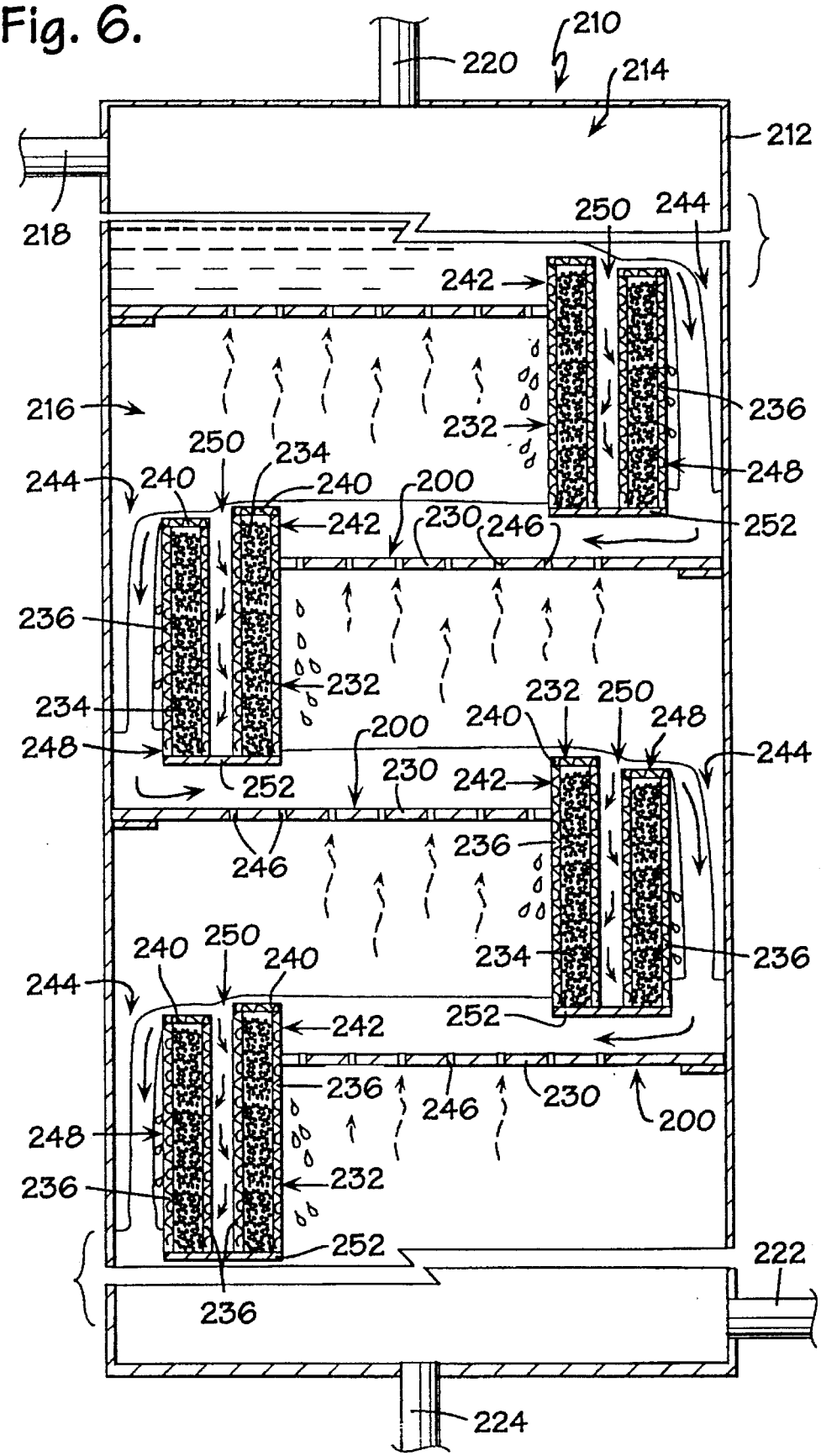
FIG. 6 is a fragmentary side elevational view of a column taken in vertical section and showing a further embodiment of a reaction with distillation structure of the present invention.

A further embodiment of a reaction with distillation structure in accordance with the present invention is shown in FIG. 6 and is represented by the numeral 200. Like reference numerals are again used to designate like parts from the other embodiments but are preceded by the prefix "2". Each reaction with distillation structure 200 is similar to the structures 100 shown in FIG. 3 except that a second catalyst container 248 is spaced downstream from the catalyst container 232 positioned at the end of each tray 230. The spacing between the containers 248 and 232 creates a region or zone 250 which is open at the top to accommodate the flow of liquid into the zone 250 as it overflows the top of container 232. The zone 250 is preferably closed at the bottom by an imperforate plate 252 which prevents liquid from flowing out of the bottom of zone 250. The liquid flowing into the zone 250 is thus forced to accumulate in zone 250 and can exit therefrom only by flowing through the catalyst beds within containers 248 and 232. Notably, the liquid flowing through the spaced apart catalyst beds encounters less resistance to flow than it would encounter if it were to flow through a catalyst bed having the combined thickness of the beds provided in containers 248 and 232.

In certain applications it may be desirable to provide plate 252 with a limited number of perforations to allow a portion of the liquid within zone 250 to flow through plate 252 while still forcing other portions of the liquid through containers 248 and 232, respectively.

Each structure 200 also includes a bypass or downcomer 244 such as previously described. The downcomer 244 is formed by the adjacent side wall 236 of container 248 and the walls of column shell 212. Preferably, liquid is prevented from accumulating in downcomer 244 so that it does not counteract the pressure generated by the liquid accumulating in zone 250 and thereby reduce the flow of liquid from zone 250 through container 248. This can be accomplished by spacing the lower surfaces of the containers 248 and 232 sufficiently above the underlying tray 230 or by limiting the volume of liquid flow entering the downcomer 244. In certain applications, the flow capacity of containers 248 and 232 may be sufficient to accommodate all of the liquid flowing on tray 230. In such applications, no liquid would overflow into downcomer 244 but liquid would still enter the downcomer 244 after passing laterally through container 248.

Reaction with distillation structures 200 provide the same advantages previously described with respect to reaction with distillation structures 28 and 100; namely, enhanced mass transfer and catalyst performance as well as increased hydraulic capacity. In addition, the use of spaced apart containers 248 and 232 increases the surface area of the catalyst beds through which the liquid flows and decreases the distance that the liquid must flow in comparison to a single container having twice the thickness of containers 248 and 232. The spaced apart containers 248 and 232 thus significantly reduce the resistance to fluid flow and permit a greater volumetric flow of liquid to be achieved.

Figure 7:
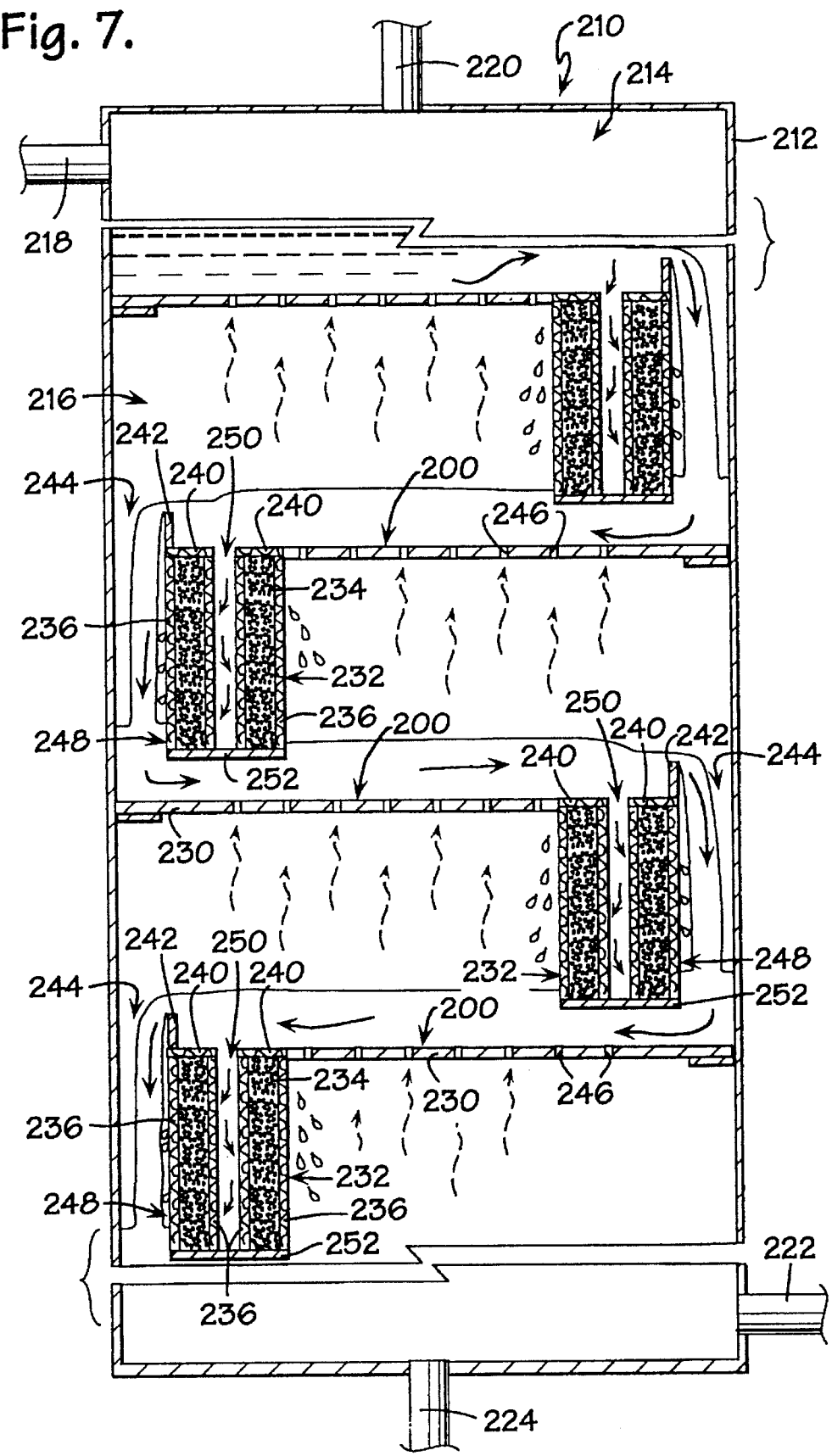
FIG. 7 is a fragmentary side elevation view of a column taken in vertical section and showing a reaction with distillation structure similar to that shown in FIG. 6 but with the tops of the catalysts containers shown level with the associated trays and plate-type overflow weirs being provided to cause liquid accumulation on the trays.

The reaction with distillation structures 200 of FIG. 6 are shown in a modified form in FIG. 7 wherein the tops of the containers 232 and 248 do not extend above the surface of tray 230. Instead, a solid plate 242 extends upwardly from the downstream side wall 236 of container 248 to form an overflow weir. It will be appreciated that the plate 242 could alternatively extend upwardly from upstream catalyst container 232 if desired.

Figure 8:
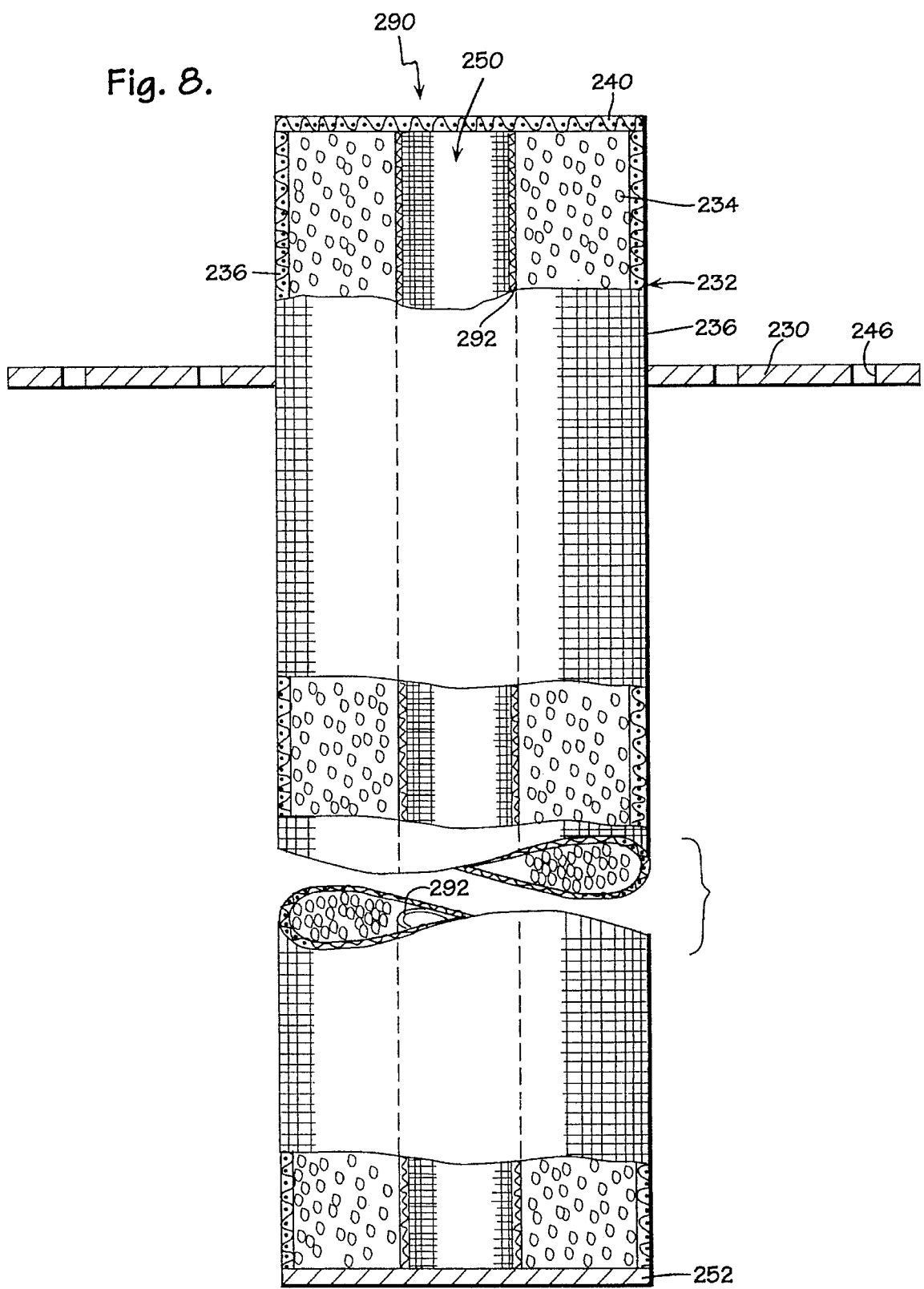
FIG. 8 is an enlarged fragmentary side elevational view of a reaction with distillation structure employing a cylindrical catalyst container, portions of the structure being taken in vertical section and other portions being broken away for purposes of illustration.

Turning now to FIG. 8, a reaction with distillation structure 290 is provided which utilizes a plurality of catalyst containers, only one of which is illustrated and is designated by the numeral 232, which are similar to those previously described except they are cylindrical in configuration. The container 232 has a perforate outer side wall 236 and a zone 250 is formed within container 232 by a cylindrical member 292 which also forms the inner side walls of container 232. The annular region between the member 292 and the outer side wall 236 is filled with catalyst particles 234 and the member 292 is perforate to accommodate the passage of liquid between the zone 250 and the catalyst bed formed by the catalyst particles 234.

The zone 250 is open at the top to permit the flow of a portion of the liquid from the tray 230 into the zone 250 without passing through the surrounding catalyst bed. The bottom of zone 250 is shown closed by an imperforate plate 252 which forces liquid entering zone 250 to accumulate and exit through the surrounding catalyst bed in container 232 under the influence of the liquid head created by the accumulated liquid. While the zone 250 has been shown extending to the bottom of the catalyst bed, it need not necessarily do so. Instead, the zone 250 may extend downward into the catalyst bed and terminate above the bottom edge of the catalyst bed. In some applications, the plate 252 may contain a limited number of perforations to allow a portion of the liquid to exit zone 250 through the plate 252 without passing through the catalyst bed. In other applications, plates 252 may be provided on only some of the containers 232. The zone 250 in those containers 232 which lack plates 252 thus functions as an open downcomer which allows liquid entering zone 250 to pass to an underlying tray 230 without passing through the catalyst bed. Liquid can be caused to accumulate on tray 230 by extending the container 232 above the top surface of tray 230 as illustrated or by using a cylindrical solid plate as an overflow weir. If a solid plate is used as an overflow weir, the top of the catalyst bed may be positioned below the level of the tray 230. In such a configuration, the solid plate should be extended below the level of the tray a sufficient distance so that it overlaps the top portion of the catalyst bed.

Reaction with distillation structure 290, employing cylindrical catalyst containers 232, can be utilized in a manner like that previously described with reference to other structures, such as structures 200, and has the attendant advantages. Structure 290 is particularly adapted for use in processes which do not require a large of catalyst for effecting catalytic reaction of the liquid stream.

Figure 9:
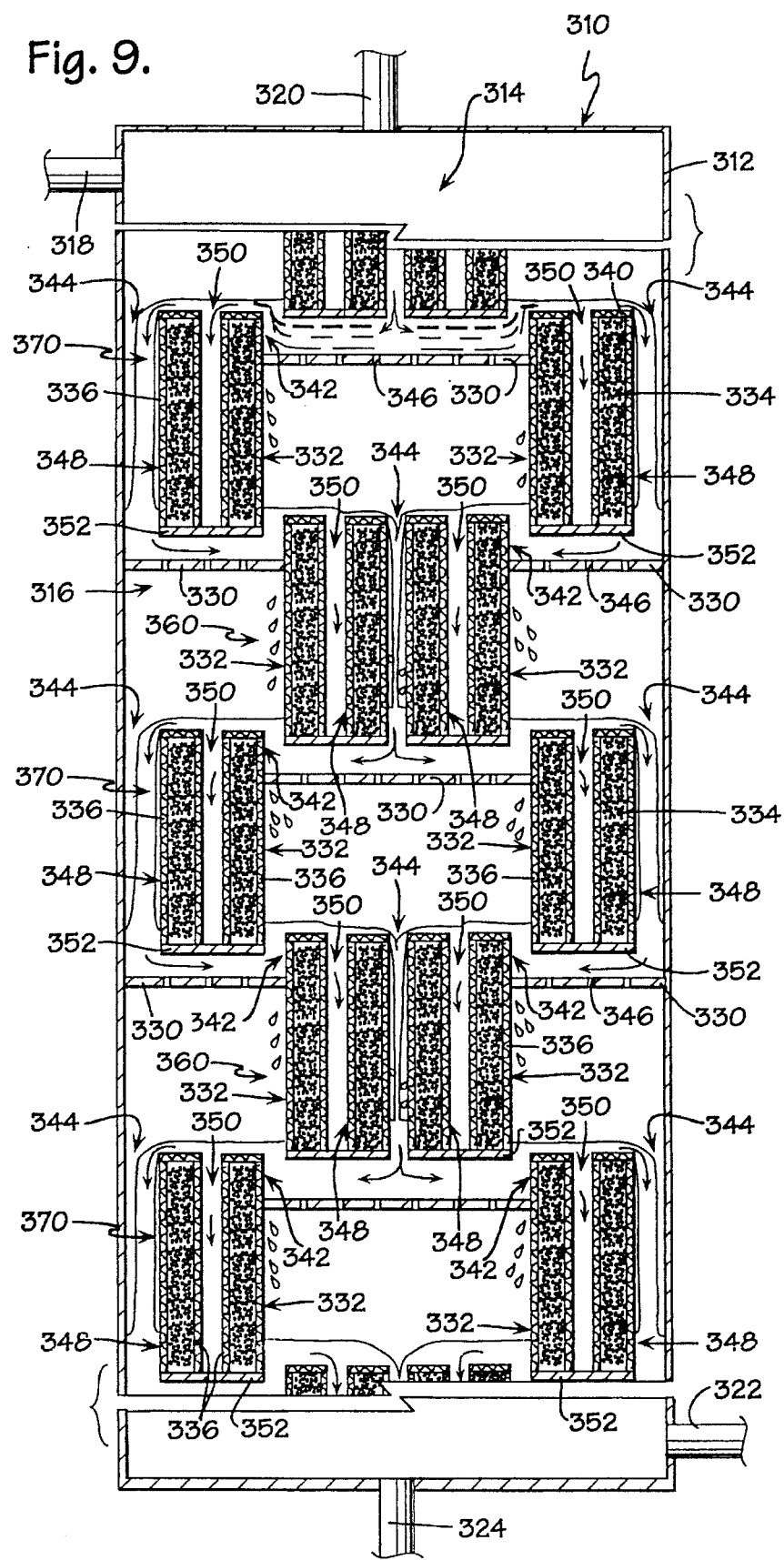
FIG. 9 is a fragmentary side elevational view of a column taken in vertical section and showing a combination of different reaction with distillation structures forming a double-pass version of the arrangement shown in FIG. 6.

Still further embodiments of reaction with distillation structures, broadly designated by the numerals 360 and 370, are shown in FIG. 9 which is a double-pass version of the arrangement shown in FIG. 6. Like reference numerals preceded by the prefix "3" have been utilized to refer to components previously described. Structures 360 and 370 are placed in alternating layers within region 316 of column 310 and are generally arranged so that liquid flowing from each structure will encounter a tray 330 of an immediately underlying structure. This arrangement serves to minimize the opportunity for liquid to bypass any of structures 360 and 370 as it descends through region 316.

Structure 360 is similar in construction to structure 200 shown in FIG. 6 except that a second pair of catalyst containers 332 and 348 and an associated tray 330 are utilized with each structure 360. Each structure 360 is arranged so that the pairs of catalyst containers 348 are centrally positioned with the associated trays 330 extending from the containers 332 to the column shell 312. The catalyst containers 332 and 348 are generally rectilinear in configuration and extend partially or completely between opposed sides of shell 312. The containers 332 and 348 may, however, be constructed in other configurations from that described and illustrated.

As previously described, a catalyst feed region 350 which is open at the top to the flow of liquid is formed between each pair of catalyst containers 332 and 348. In addition, a bypass or downcomer 344 is formed in the spacing between the innermost containers 348 so that liquid which flows over the tops of containers 348 is directed into the downcomer 344 once the catalyst feed regions 350 are filled. In order to prevent vapor from flowing upwardly through the downcomer 344, a suitable static seal is provided. In order to permit the flow of liquid from within the adjacent containers 348 into the downcomer 344, it is preferred that the liquid backup in downcomer 344 only fills a lowermost portion of the downcomer.

Liquid is directed from downcomer 344 of structure 360 through the central opening in plate 352 and encounters the underlying reaction with distillation structure 370. Structure 370 is generally a two-pass version of the structure 200 shown in FIG. 6. Each structure 370 thus includes a central tray 330 with a pair of spaced apart catalyst containers 332 and 348 which are positioned at both ends of the central tray 330. Liquid on structure 370 is received generally centrally and is then forced to flow outwardly along tray 330 toward either end thereof. Liquid then can either enter container 348, region 350, container 332 or downcomer 344 for passage to the underlying tray 330 of structure 360.

Reaction with distillation structure 360 has, in addition to the benefits presented by the structures previously discussed, the added advantage of increasing the amount of liquid flow which can be directed through the catalyst beds within containers 332 and 348. This is accomplished by utilizing four separate catalyst packed containers within each structure 360 and permitting lateral flow of liquid through each container. The number of containers used in each structure is not limited to four but may include more than that number. Flow volume through the catalyst beds is also increased by the use of multiple feed regions 350 which must be filled before liquid will enter the central downcomer 344. This ensures that a maximum liquid head is always available to drive the liquid laterally through the catalyst beds associated with the regions 350. Notably, in some applications the hydraulic capacity of the catalyst beds will be sufficient to accommodate the entire volumetric flow of liquid descending through the reaction with distillation region 316. Even greater liquid handling and catalyst containing capacities can be obtained by arranging the structures 360 and 370 to provide a three-pass, four-pass or greater configuration.

While containers 332 and 348 are shown positioned so that their covers 340 extend above the top surface of trays 330 to form overflow weirs 342, it will be appreciated that a solid upright plate may instead be provided for this purpose. The plate could be placed upstream from the containers, such as at the edge of the tray 330, or downstream at the edge of downcomer 344, or anywhere in between if desired.

Figure 10:
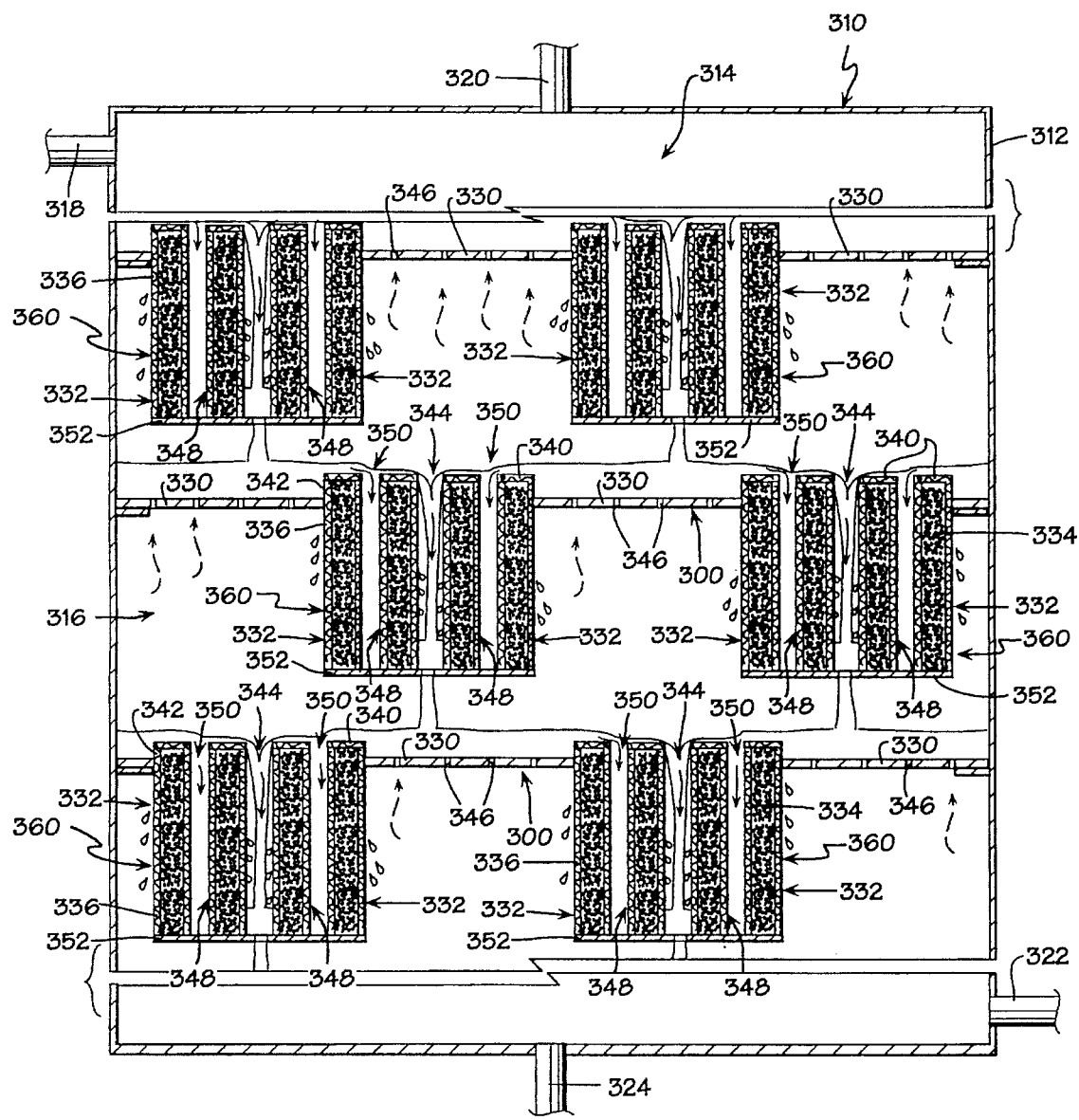
FIG. 10 is a fragmentary side elevational view of a column taken in vertical section and showing a different arrangement of one of the types of reaction with distillation structures illustrated in FIG. 9.

Turning now to FIG. 10, it can be seen that multiple reaction with distillation structures 360 can be provided at each level within column region 316. As previously described, each structure 360 comprises two pairs of catalyst containers 332 and 348 and a portion of an associated tray 330. A catalyst feed region 350 is formed between each pair of containers 332 and 348 and a downcomer 344 is provided between the paired containers 332 and 348. Preferably, in the structure 360 which is placed closest to shell 312 at each level, the containers 332 and 348 are sized so that they do not extend completely between the opposed sides of the shell 312. This permits a portion of the liquid on associated tray 330 to travel around the ends of the containers 332 and 348 to feed the narrow tray portion which extends between the shell 312 and the side wall 336 of the container 332 which is nearest the shell 312.

The structures 360 are positioned in a vertically staggered arrangement so that the discharge from each downcomer 344 contacts the tray 330 of an underlying structure. This arrangement reduces the opportunity for liquid to bypass a level of structures and the associated mass transfer which occurs at each level. While only two structures 360 have been shown at each level within region 316, in many applications it will be desirable to use more than two such structures to provide a multiple-pass arrangement. It will be appreciated that the mass transfer performance of the structures 360 is reduced as the tray 330 is reduced in area and divided into numerous smaller segments by the multiple containers 332 and 348. Accordingly, the increased liquid flow rate and catalyst capacity which can be achieved by placement of a number of structures 360 at each level must be balanced against the accompanying decrease in mass transfer performance which can be obtained.

While the horizontal longitudinal axes of the containers 332 and 348 in adjacent levels of structures 360 have been shown in parallel alignment in FIG. 10, in some applications it may be desired or preferred that they extend at angles up to and including 90°, such as is shown in FIG. 11. In FIG. 11, the longitudinal axes of containers 332 and 348 at one level extend at right angles to the longitudinal axes of containers 332 and 348 in adjacent levels. In order to prevent liquid from passing from the downcomer 344 discharge at one level directly into the open top of an underlying downcomer 344, an imperforate plate 380 can be provided to close the bottom of each downcomer along that portion which lies directly over the inlet of an underlying downcomer. Preferably, the plate 380 is sized large enough to divert the liquid discharge away from the underlying regions 350 and containers 332 and 348 as well. Various other alternative arrangements are possible to reduce the amount of liquid which bypasses mass transfer at each level of structures 360.

It will be appreciated that numerous modifications to the reaction with distillation structures, as well as their placement, can be made and remain within the scope of the present invention.

From the foregoing, it will be seen that this invention is one well adapted to attain all the ends and objects hereinabove set forth together with other advantages which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A process for operating a column containing a plurality of reaction with distillation structures comprising a tray and first and second catalyst beds extending downwardly below the tray, the first and second catalyst beds having a zone formed therebetween which is open at the top to the passage of liquid, at least one of said reaction with distillation structures additionally comprising a bypass which allows a liquid stream to descend from the tray without passing through the first and second catalyst beds, said process comprising the steps of:

supplying a liquid stream to one of said reaction with distillation structures and causing an accumulation of said liquid stream on the tray of said reaction with distillation structure;

directing at least a first portion of the accumulated liquid stream into said zone between the first and second catalyst beds;

passing at least part of said first portion of the liquid stream from the zone through said first and second catalyst beds for catalytic reaction to form a reaction product;

directing a second portion of the accumulated liquid stream into said bypass without passing through said first and second catalyst beds;

passing a first part of said second portion of the accumulated liquid stream through said bypass; and directing a vapor stream upwardly through said reaction with distillation structures for contact with said accumulated liquid stream on the tray.

2. The process as set forth in claim 1, including the step of accumulating at least part of said first portion of the accumulated liquid stream and said first part of the second portion of the accumulated liquid stream on an underlying reaction with distillation structure after passage of said first portion through said first and second catalyst beds and said first part of said second portion through the bypass.

3. The process as set forth in claim 1, wherein the step of passing at least part of said first portion of the liquid stream from the zone comprises the step of passing substantially all of said first portion of the liquid stream from the zone through said first and second catalyst beds.

4. The process as set forth in claim 1, including the step of passing some of said at least part of said first portion of the liquid stream into said bypass after passing from the zone through said first or second catalyst bed.

5. The process as set forth in claim 1, including the step of directing the second portion of the accumulated liquid stream into the bypass at a flow rate sufficient to cause said second portion to accumulate within the bypass.

6. The process as set forth in claim 1, wherein the step of directing at least a first portion of the accumulated liquid stream into said zone comprises directing at least some of said first portion of the accumulated liquid stream into the zone without passing through said first or second catalyst beds.

7. The process as set forth in claim 1, wherein the step of directing at least a first portion of the accumulated liquid stream into said zone comprises directing a first part of said first portion of the accumulated liquid stream into the zone without passing through said first or second catalyst beds and directing a second part of said first portion of the accumulated liquid stream into the zone by passing through said first or second catalyst beds.

8. The process as set forth in claim 1, including directing a third portion of the accumulated liquid stream into said first or second catalyst beds without entering said zone between the first and second catalyst beds and then removing at least some of the third portion of the accumulated liquid stream from said first or second catalyst beds into an area away from said zone.

9. The process as set forth in claim 1, including the step of passing a second part of said second portion of the accumulated liquid stream from within the bypass through said first or second catalyst beds.

10. A process for operating a column containing a plurality of reaction with distillation structures, each of said reaction with distillation structures comprising trays, a first pair of spaced apart catalyst beds coupled with and extending downwardly below one of the trays, and a second pair of spaced apart catalyst beds coupled with and extending downwardly below another of the trays, the first pair of catalyst beds having a first zone formed therebetween and the second pair of catalyst beds having a second zone formed therebetween, each of said first and second zones being open at the top to the passage of liquid, at least one of said trays on one of the reaction with distillation structures having a bypass between the first and second pairs of catalyst beds which allows a liquid stream to descend from the tray without passing through the first and second pairs of catalyst beds, said process comprising the steps of:

supplying a liquid stream to one of said reaction with distillation structures and causing an accumulation of said liquid stream on the trays thereof;

directing first portions of the accumulated liquid stream into said first and second zones between the first and second pairs of catalyst beds;

passing at least part of said first portions of the liquid stream from the zones through said first and second pairs of catalyst beds for catalytic reaction to form a reaction product;

directing at least some of said part of said first portions of the accumulated liquid stream into the bypass from one of the catalyst beds in each of said first and second pairs of catalyst beds;

directing a second portion of said accumulated liquid streams from the trays into the bypass without passing through either of said first and second pairs of catalyst beds; and directing a vapor stream upwardly through said reaction with distillation structures for contact with said accumulated liquid stream on said trays.

11. The process as set forth in claim 10, including the steps of passing said second portion of the liquid stream downwardly through said bypass and then accumulating at least part of said first portions and said second portion of the liquid stream on an underlying reaction with distillation structure after passage of said first portion through said first and second pairs of catalyst beds and said second portion through the bypass.

12. A process for operating a column containing a plurality of reaction with distillation structures, said reaction with distillation structures comprising a tray and a catalyst bed extending downwardly below the tray, the bed having a zone formed therein which is open at the top to the passage of liquid, said process comprising the steps of:

supplying a liquid stream to one of said reaction with distillation structures and causing an accumulation of said liquid stream on the tray of said reaction with distillation structure;

directing at least a first portion of the accumulated liquid stream into said zone within the catalyst bed without passing through the catalyst bed;

passing at least part of said first portion of the liquid stream from the zone through said catalyst bed for catalytic reaction to form a reaction product;

passing another part of said first portion of the liquid stream through the zone without passing through said catalyst bed;

directing a vapor stream upwardly through said reaction with distillation structures for contact with said accumulated liquid stream on the tray; and accumulating said first portion of the liquid stream on an underlying reaction with distillation structure after passage through said zone and said catalyst bed.

13. The process as set forth in claim 12, including the step of directing a second portion of the liquid stream from the tray into said catalyst bed for said catalytic reaction to form the reaction product.

14. A process for operating a column containing a plurality of reaction with distillation structures, each of said reaction with distillation structures comprising a tray, a first pair of spaced apart catalyst beds coupled with and extending downwardly below the tray, and a second pair of spaced apart catalyst beds coupled with and extending downwardly below the tray, directing a vapor stream upwardly through said reaction with distillation structures for contact with said accumulated liquid stream on the tray.

15. The process as set forth in claim 14, wherein the step of passing at least part of said first portions of the liquid stream from the zones comprises the step of passing substantially all of said first portions of the liquid stream from the zones through said first and second pairs of catalyst beds.

16. The process as set forth in claim 14, including the step of directing the second portion of the accumulated liquid stream into the bypass at a flow rate sufficient to cause said second portion to accumulate within the bypass.

17. The process as set forth in claim 14, wherein the step of directing first portions of the accumulated liquid stream into said zones comprises directing at least some of said first portions of the accumulated liquid stream into the zones without passing through said first and second pairs of catalyst beds.

18. The process as set forth in claim 17, including directing some of said first portions of the accumulated liquid stream into the zones by passing through said first or second pairs of catalyst beds.

19. The process as set forth in claim 14, including the steps of directing the second portion of the accumulated liquid stream into the bypass at a flow rate sufficient to cause said second portion to accumulate within the bypass and directing some of said accumulated second portion of the accumulated liquid stream from within the bypass through said first or second pairs of catalyst beds.

20. The process as set forth in claim 14, including directing a third portion of the accumulated liquid stream into said catalyst beds without entering said zones and then removing at least some of the third portion of the accumulated liquid stream from said catalyst beds into an area away from said zones.

* * * * *

UNITED STATES PATENT AND TRADEMARK OFFICE
CERTIFICATE OF CORRECTION

PATENT NO. : 5,593,548
DATED : January 14, 1997
INVENTOR(S) : Neil Yeoman et al.

It is certified that error appears in the above-indentified patent and that said Letters Patent is hereby corrected as shown below:

At column 18, line 12, before the word "directing" please insert the following paragraphs:

--the first pair of catalyst beds having a first zone formed therebetween and the second pair of catalyst beds having a second zone formed therebetween, each of said first and second zones being open at the top to the passage of liquid, at least one of said trays on one of the reaction with distillation structures having a bypass between the first and second pairs of catalyst beds which allows a liquid stream to descend from the tray without passing through the first and second pairs of catalyst beds, said process comprising the steps of:

supplying a liquid stream to one of said reaction with distillation structures and causing an accumulation of said liquid stream on the trays thereof;

directing first portions of the accumulated liquid stream into said first and second zones between the first and second pairs of catalyst beds;

passing at least part of said first portions of the liquid stream from the zones through said first and second pairs of catalyst beds for catalytic reaction to form a reaction products;

UNITED STATES PATENT AND TRADEMARK OFFICE
CERTIFICATE OF CORRECTION

PATENT NO. : 5,593,548
DATED : January 14, 1997
INVENTOR(S) : Neil Yeoman et al.

It is certified that error appears in the above-indentified patent and that said Letters Patent is hereby corrected as shown below:

directing at least some of said part of said first portions of the accumulated liquid stream into the bypass from one of the catalyst beds in each of said first and second pairs of catalyst beds;

directing a second portion of said accumulated liquid streams from the trays into the bypass without passing through either of said first and second pairs of catalyst beds; and--.

Signed and Sealed this

Fifteenth Day of June, 1999

Q. TODD DICKINSON

Attest:

Attesting Officer     Acting Commissioner of Patents and Trademarks